(12) United States Patent
Skvoretz et al.

(10) Patent No.: US 11,620,960 B2
(45) Date of Patent: Apr. 4, 2023

(54) SYNCHRONOUS DISPLAY BLINKING

(71) Applicant: Intermec IP Corporation, Charlotte, NC (US)

(72) Inventors: Matthew A. Skvoretz, Charlotte, NC (US); Abhay Ravi Chandran, Aberdeen, MD (US); Charles Joseph Cunningham, IV, Broomall, PA (US); Glenn David Aspenns, Cincinnati, OH (US); Hardik Yomesh Jani, Lawrenceville, NJ (US)

(73) Assignee: INTERMEC IP CORPORATION, Charlotte, NC (US)

( * ) Notice: Subject to any disclaimer, the term of this patent is extended or adjusted under 35 U.S.C. 154(b) by 0 days.

(21) Appl. No.: 17/450,883

(22) Filed: Oct. 14, 2021

(65) Prior Publication Data
US 2022/0122555 A1 Apr. 21, 2022

Related U.S. Application Data

(60) Provisional application No. 63/094,002, filed on Oct. 20, 2020.

(51) Int. Cl.
*G09G 3/36* (2006.01)
*G06F 3/14* (2006.01)
*G06F 3/147* (2006.01)
*H02J 7/00* (2006.01)
*G09G 5/12* (2006.01)
(Continued)

(52) U.S. Cl.
CPC ............... *G09G 3/36* (2013.01); *G06F 3/147* (2013.01); *G06F 3/1423* (2013.01); *G06F 15/17325* (2013.01); *G09G 5/12* (2013.01); *H02J 7/0047* (2013.01); *G09G 2310/08* (2013.01); *G09G 2330/026* (2013.01); *G09G 2370/025* (2013.01); *H04L 41/12* (2013.01); *H04W 76/10* (2018.02)

(58) Field of Classification Search
CPC ......... G06G 3/36; G06F 3/1423; G06F 3/147; G06F 15/17325; H02J 7/0047; G09G 2310/08; G09G 2330/026; G09G 2370/025; G09G 5/12; G09G 3/36; H04L 41/12; H04W 76/10
USPC ....................................................... 345/213
See application file for complete search history.

(56) References Cited

U.S. PATENT DOCUMENTS 3,938,080 A    2/1976  Hulme
8,676,120 B2 * 3/2014  Zhang .................. H04W 76/10
                                                          455/426.2

(Continued)

OTHER PUBLICATIONS

European Search Report and Search Opinion received for EP Application No. 21203567.9, dated Mar. 28, 2022, 10 pages.

*Primary Examiner* — Tom V Sheng
(74) *Attorney, Agent, or Firm* — Alston & Bird LLP

(57) ABSTRACT

Various example embodiments described herein relate to a method for synchronizing liquid crystal display (LCD) screens. In some examples, the method includes establishing, by a first device comprising a processor, a master/slave relationship with one or more other devices; determining, by the first device, a frequency associated with turning on a first LCD screen on the first device; and sending, by the first device, a signal to each of the one or more other devices, wherein the signal comprises an instruction to turn on an LCD screen on each receiving device at a same time as the first LCD screen.

19 Claims, 5 Drawing Sheets

(51) Int. Cl.
  *G06F 15/173* (2006.01)
  *H04W 76/10* (2018.01)
  *H04L 41/12* (2022.01)

(56) References Cited

U.S. PATENT DOCUMENTS

2012/0308979 A1 12/2012 Knowles et al.
2014/0143445 A1* 5/2014 Tuli ..................... G06Q 10/10
                                                              709/248
2019/0043446 A1* 2/2019 Suzuki .................. G06F 3/1431

* cited by examiner

SYNCHRONOUS DISPLAY BLINKING

CROSS-REFERENCE TO RELATED APPLICATIONS

This application claims the benefit of U.S. Provisional Application No. 63/094,002 filed Oct. 20, 2020, the contents of which are hereby incorporated by reference in their entirety.

TECHNICAL FIELD

The present application relates generally to apparatuses, systems and methods that can perform synchronous LCD blinking.

BACKGROUND

Batteries are used with many electronic devices such as mobile phones, personal data assistants (PDAs), computers, and the like. In order for these batteries to be charged more quickly, the device may shed load so as to maximize current to the battery. However, current shed may lead to deactivation of a display. Recently, there have been numerous developments in the field of imaging technology which have rendered the imaging modules to be small, reliable, easy to use, and robust. Through applied effort, ingenuity, and innovation, the problems identified herein have been solved by developing solutions that are included in embodiments of the present disclosure, many examples of which are described in detail herein.

SUMMARY

The following presents a simplified summary to provide a basic understanding of some aspects of the disclosed method and related devices for synchronizing liquid crystal display (LCD) screens and the like. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a method for synchronizing LCD screens. In some examples, the method includes establishing, by a first device comprising a processor, a master/slave relationship with one or more other devices; determining, by the first device, a frequency associated with turning on a first LCD screen on the first device; and sending, by the first device, a signal to each of the one or more other devices, wherein the signal comprises an instruction to turn on an LCD screen on each receiving device at a same time as the first LCD screen.

Various example embodiments described herein relate to an electronic device that includes a processor and a non-transitory memory including computer program instructions configured to, when executed by the processor, cause the electronic device to at least determine that there is not a current master device of a set of devices and transmit a synchronization signal to each device of the set of devices, wherein the synchronization signal comprises an instruction about when to activate respective LCD screens on each device of the set of devices.

Various example embodiments described herein relate to an electronic device that includes a processor and a non-transitory memory including computer program instructions configured to, when executed by the processor, cause the electronic device to at least receive a synchronization signal comprising an instruction about when to activate an LCD screen on the electronic device and activate said LCD screen based on the synchronization signal.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
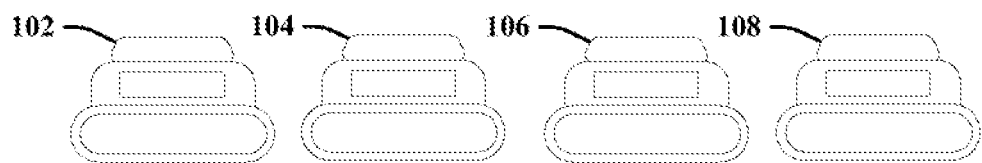
FIG. 1 illustrates an exemplary group of devices that can synchronize the blinking of their LCD screens in accordance with various aspects and embodiments of the subject disclosure.
Figure 1:
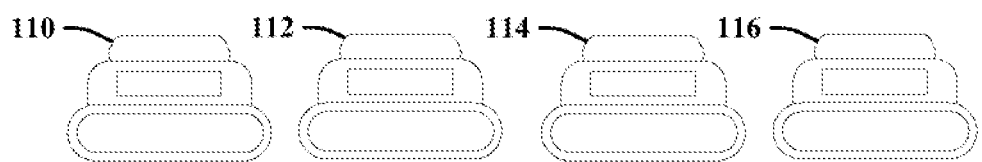
Figure 1:
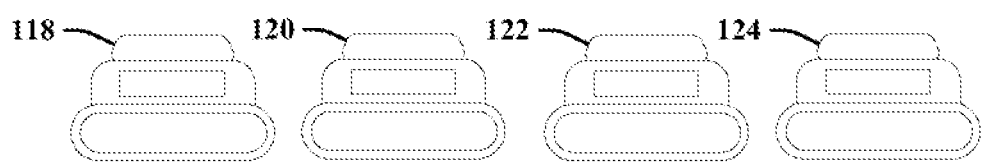

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details.

In some examples, devices are configured to shed load so as to maximize current to the battery and to limit any heating of the battery due to power loss to other circuits. In some examples, a major contributor to a load on a device is a display, such as an LCD display. However, and in some examples, a user may require a display to remain active for multiple reasons to indicate the charging status.

Various embodiments disclosed herein provide for synchronizing the blinking or duty cycle of liquid crystal display (LCD) screens across a plurality of devices so as to provide an active display while reducing overall load. In some examples and in order to synchronize, a device of the plurality of devices can send a synchronization signal to the other devices in the plurality of devices, where the synchronization signal, in some examples, comprises an instruction and/or information to facilitate synchronized activation and deactivation of the LCD screens of the plurality of devices.

In some embodiments, light-emitting diode (LED) indicators on a device can be used as a mechanism to signal a status, such as charging, charging complete, error or the like. While such LEDs may be beneficial to a user, LEDs also can be a drain on batteries and/or delay the time to a full charge. As such, instead of a constant LED signal, the devices may be configured to blink or otherwise intermittently activate the LED. In this way and similar to the disclosure with respect to LCD screens herein, LEDs on a plurality of devices can be synchronized by a first device sending a synchronization signal to one or more other devices also having an LED indicator. The synchronization signal comprising instructions to facilitate synchronized activation and deactivation of the LED indicators.

Advantageously and in some examples, synchronizing the duty cycle controls blinking that occurs when a display, such as an LCD, is driven at a lower duty cycle. Moreover, synchronizing blinking improves the readability when a user is looking at a large number of devices at the same time or substantially the same time. As is described herein, synchronization can occur by having the devices communicate with each other over a link.

In some examples, in order to synchronize multiple devices, a single device or a master device may be established. Establishment of a synchronization master can be performed automatically upon a device being plugged in for charging. For example, the first device that was plugged in for charging or the most recent device that was plugged in for charging could be set as the master. In addition, if a master is removed, a second master can automatically take the place of the former master device. Alternatively, or additionally, there can be designated or otherwise selected semi-permanent master devices that provide synchronization signals to the other devices.

As used in this disclosure, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to FIG. 1, illustrated is an exemplary group of devices that can synchronize the blinking of their LCD screens in accordance with various aspects and embodiments of the subject disclosure.

In an embodiment, device 102, 104, 106, 108, 110, 112, 114, 116, 118, 120, 122, and 124 can be devices that are charging on a charging dock or charging within a predetermined distance from each other. To reduce the load on the batteries of the devices while they are charging, the devices can be configured to turn the LCD screens off and on intermittently during the charging process. This intermittent disabling of the LCD can reduce the time required for charging.

Moreover, and so that the user is not confronted with a large number of devices with LCDs that turn on intermittently in a haphazard manner, the devices can self-synchronize the activation of their LCD screens so that the user can easily identify which devices have completed charging. The LCD can display a color indicating charging progress—e.g., the LCD can display a red color when the battery is highly discharged, orange color when the battery has been partially recharged, and green when the battery has been charged past a predetermined level. In other embodiments, other colors or notification schemes are possible.

In an embodiment, the devices can be any of wearable devices, pager devices, mobile phones, or other devices that are charged nearby each other. Furthermore, while FIG. 1 depicts a charging dock with 12 devices, the solution disclosed herein is applicable whenever there is a plurality of devices present and can apply when there are any number of devices.

In some embodiments, a device, such as device 102, can send a synchronization signal to each of the other devices 104-124. The synchronization signal being received by the devices 104-124 can establish a master/slave relationship where devices 104-124 will activate their LCDs based on the synchronization signal received from device 102. The synchronization signal can comprise information about when to activate their LCDs (e.g. at a specified time) or the devices 104-124 can activate their LCDs upon receipt of the synchronization signal.

In some embodiments, the time at which the first LCD screen and the second LCD screen are activated is based upon network time protocol (NTP) wherein the master device is the time source. In other embodiments, the first LCD screen and the second LCD screen may be activated at a preset time.

In some embodiments, the synchronization signal can comprise information about a duration for which the LCDs will be activated. In other embodiments, the duration is a predefined duration. In an embodiment, the device 102 can repeatedly send a synchronization signal every cycle, and in other embodiments, the device 102 can send an initial synchronization signal and devices 104-124 activate their LCDs on a recurring basis based on information within the synchronization signal or at predefined intervals for predefined durations.

In some embodiments, the master device can be the device that has been in the charging dock/station for the longest time. In other embodiments, the device that is the master device is the first device to send a synchronization signal that is received by the other devices. When the master device is removed, the next master device can be the first subsequent device to send a synchronization signal. In other embodiments, when a master device is removed, the device that has been charging the next longest period of time can become the master device.

In yet other embodiments, when a device is added, or when a device initiates charging, the device can be configured to listen for synchronization signals from existing master devices. In other embodiments, when a device initiates charging, the device transmits a synchronization signal and becomes the master device—thus the master device is whichever device was most recently plugged in and/or starts charging.

Figure 2:
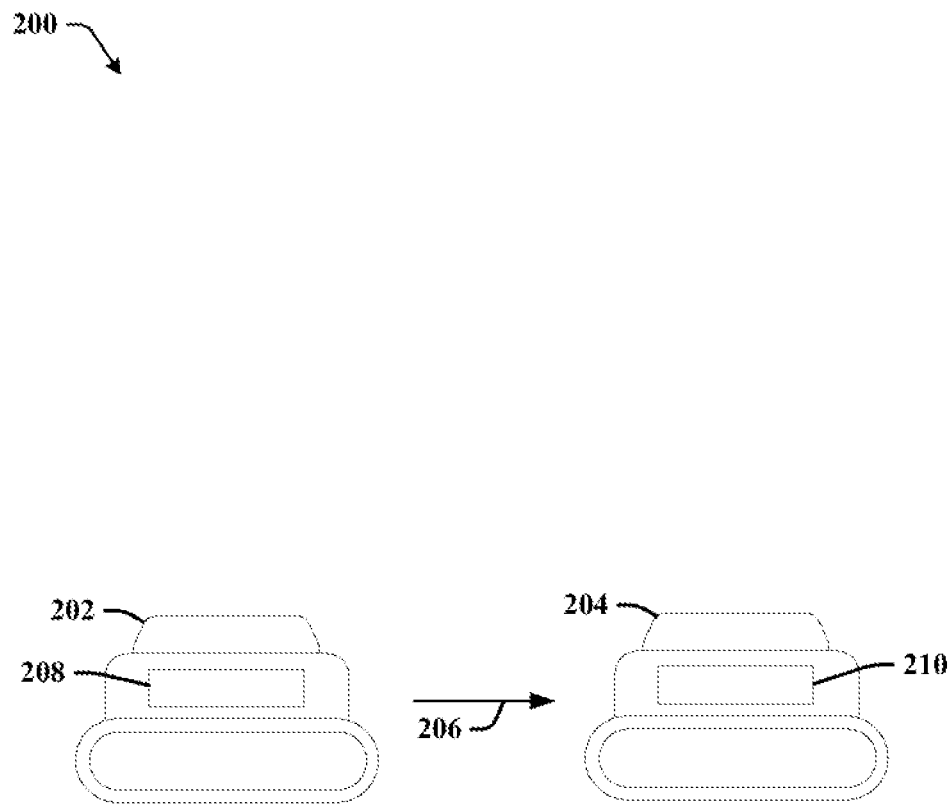
FIG. 2 illustrates an exemplary group of devices that can synchronize the blinking of their LCD screens in accordance with various aspects and embodiments of the subject disclosure.

Turning now to FIG. 2, illustrated is an exemplary group of devices that can synchronize the blinking of their LCD screens in accordance with various aspects and embodiments of the subject disclosure.

In an embodiment, the synchronization signal can be sent via BLE (Bluetooth Low Energy), RFID, Wi-Fi, or via a wired communication (e.g., Ethernet, USB, etc.). In accordance with the description of FIG. 1, the device 202 can transmit the synchronization signal 206 to another device 204. Based on the synchronization signal 206, the devices 202 and 204 can activate their LCDs 208 and 210 at the same time for the same duration.

In an embodiment, the devices 202 and 204 can be connected via Wi-Fi to a network, and the synchronization signal can be sent to all devices on a given subnet.

Figure 3:
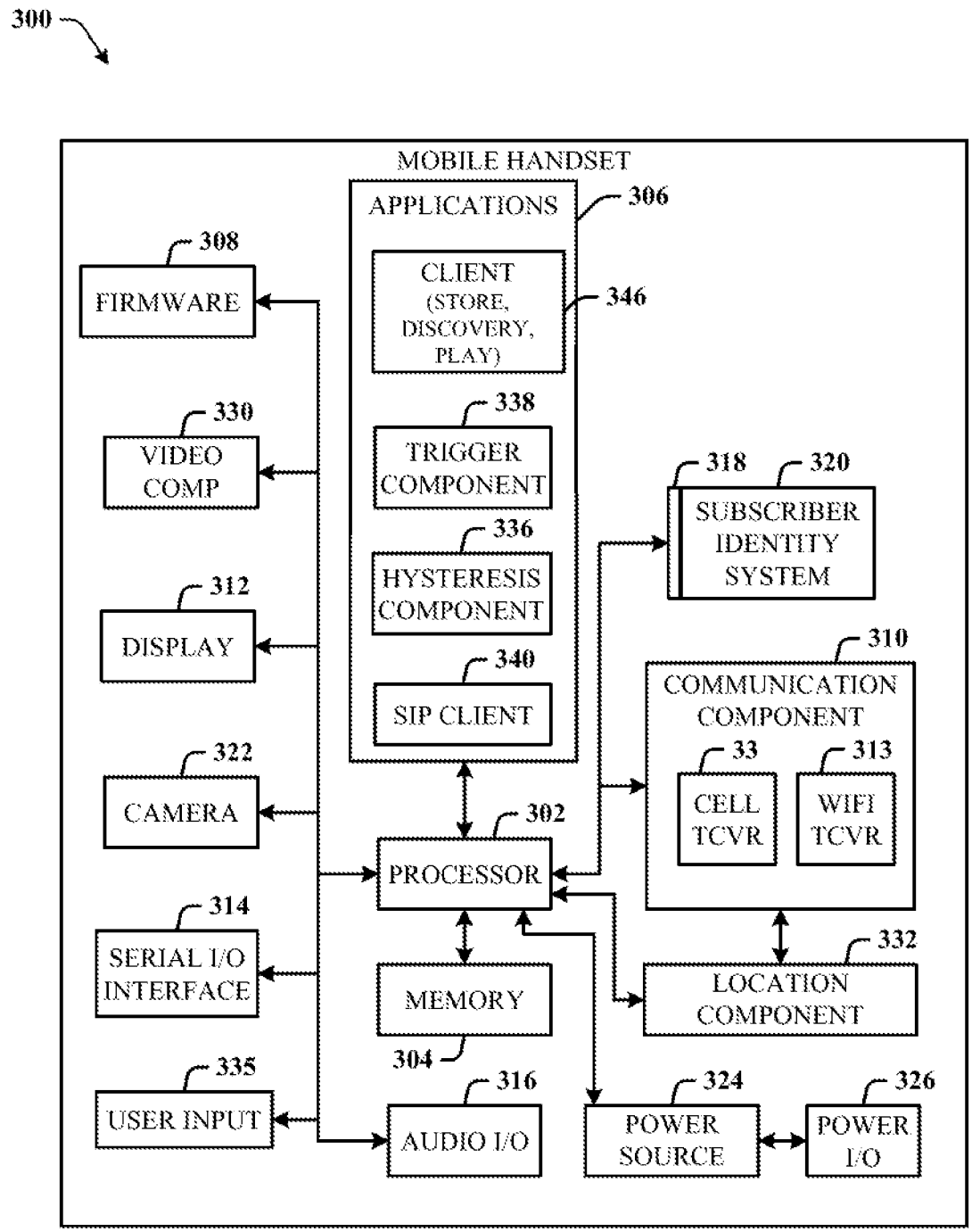
FIG. 3 illustrates an example block diagram of a mobile device that can be operable to execute processes and methods in accordance with various aspects and embodiments of the subject disclosure.

Referring now to FIG. 3, illustrated is a schematic block diagram of an example end-user device (e.g., devices 102-124) that can take the form a mobile device 300 capable of connecting to a network in accordance with some embodiments described herein. Although a mobile handset 300 is illustrated herein, it will be understood that other devices can be a mobile device, and that the mobile handset 300 is merely illustrated to provide context for the various embodiments described herein. The following discussion is intended to provide a brief, general description of an example of an end-user device. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 300 includes a processor 302 for controlling and processing all onboard operations and functions. A memory 304 interfaces to the processor 302 for storage of data and one or more applications 306 (e.g., a video player software, user feedback component software, etc.). Other applications can include voice recognition of predetermined voice commands that facilitate initiation of the user feedback signals. The applications 306 can be stored in the memory 304 and/or in a firmware 308 and executed by the processor 302 from either or both the memory 304 and/or the firmware 308. The firmware 308 can also store startup code for execution in initializing the handset 300. A communications component 310 interfaces to the processor 302 to facilitate wired/wireless communication with external systems, e.g., cellular networks, VoIP networks, and so on. Here, the communications component 310 can also include a suitable cellular transceiver 311 (e.g., a GSM transceiver) and/or an unlicensed transceiver 313 (e.g., Wi-Fi, WiMax) for corresponding signal communications. The handset 300 can be a device such as a cellular telephone, a PDA with mobile communications capabilities, and messaging-centric devices. The communications component 310 also facilitates communications reception from terrestrial radio networks (e.g., broadcast), digital satellite radio networks, and Internet-based radio services networks.

The handset 300 includes a display 312 for displaying text, images, video, telephony functions (e.g., a Caller ID function), setup functions, and for user input. For example, the display 312 can also be referred to as a "screen" that can accommodate the presentation of multimedia content (e.g., music metadata, messages, wallpaper, graphics, etc.). The display 312 can also display videos and can facilitate the generation, editing and sharing of video quotes. A serial I/O interface 314 is provided in communication with the processor 302 to facilitate wired and/or wireless serial communications (e.g., USB, and/or IEEE 1394) through a hardwire connection, and other serial input devices (e.g., a keyboard, keypad, and mouse). This supports updating and troubleshooting the handset 300, for example. Audio capabilities are provided with an audio I/O component 316, which can include a speaker for the output of audio signals related to, for example, indication that the user pressed the proper key or key combination to initiate the user feedback signal. The audio I/O component 316 also facilitates the input of audio signals through a microphone to record data and/or telephony voice data, and for inputting voice signals for telephone conversations.

The handset 300 can include a slot interface 318 for accommodating a SIC (Subscriber Identity Component) in the form factor of a card Subscriber Identity Module (SIM) or universal SIM 320 and interfacing the SIM card 320 with the processor 302. However, it is to be appreciated that the SIM card 320 can be manufactured into the handset 300 and updated by downloading data and software.

The handset 300 can process IP data traffic through the communication component 310 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 322 (e.g., a camera) can be provided for decoding encoded multimedia content. The video processing component 322 can facilitate the generation, editing and sharing of video quotes. The handset 300 also includes a power source 324 in the form of batteries and/or an AC power subsystem, which power source 324 can interface to an external power system or charging equipment (not shown) by a power I/O component 326.

The handset 300 can also include a video component 330 for processing video content received and for recording and transmitting video content. For example, the video component 330 can facilitate the generation, editing and sharing of video quotes. A location tracking component 332 facilitates geographically locating the handset 300. As described hereinabove, this can occur when the user initiates the feedback signal automatically or manually. A user input component 334 facilitates the user initiating the quality feedback signal. The user input component 334 can also facilitate the generation, editing and sharing of video quotes. The user input component 334 can include such conventional input device technologies such as a keypad, keyboard, mouse, stylus pen, and/or touch screen, for example.

Referring again to the applications 306, a hysteresis component 336 facilitates the analysis and processing of hysteresis data, which is utilized to determine when to associate with the access point. A software trigger component 338 can be provided that facilitates triggering of the hysteresis component 336 when the Wi-Fi transceiver 313 detects the beacon of the access point. A SIP client 340 enables the handset 300 to support SIP protocols and register the subscriber with the SIP registrar server. The applications 306 can also include a client 342 that provides at least the capability of discovery, play and store of multimedia content, for example, music.

The handset 300, as indicated above related to the communications component 810, includes an indoor network radio transceiver 313 (e.g., Wi-Fi transceiver). This function supports the indoor radio link, such as IEEE 802.11, for the dual-mode GSM handset 300. The handset 300 can accommodate at least satellite radio services through a handset that can combine wireless voice and digital radio chipsets into a single handheld device.

Figure 4:
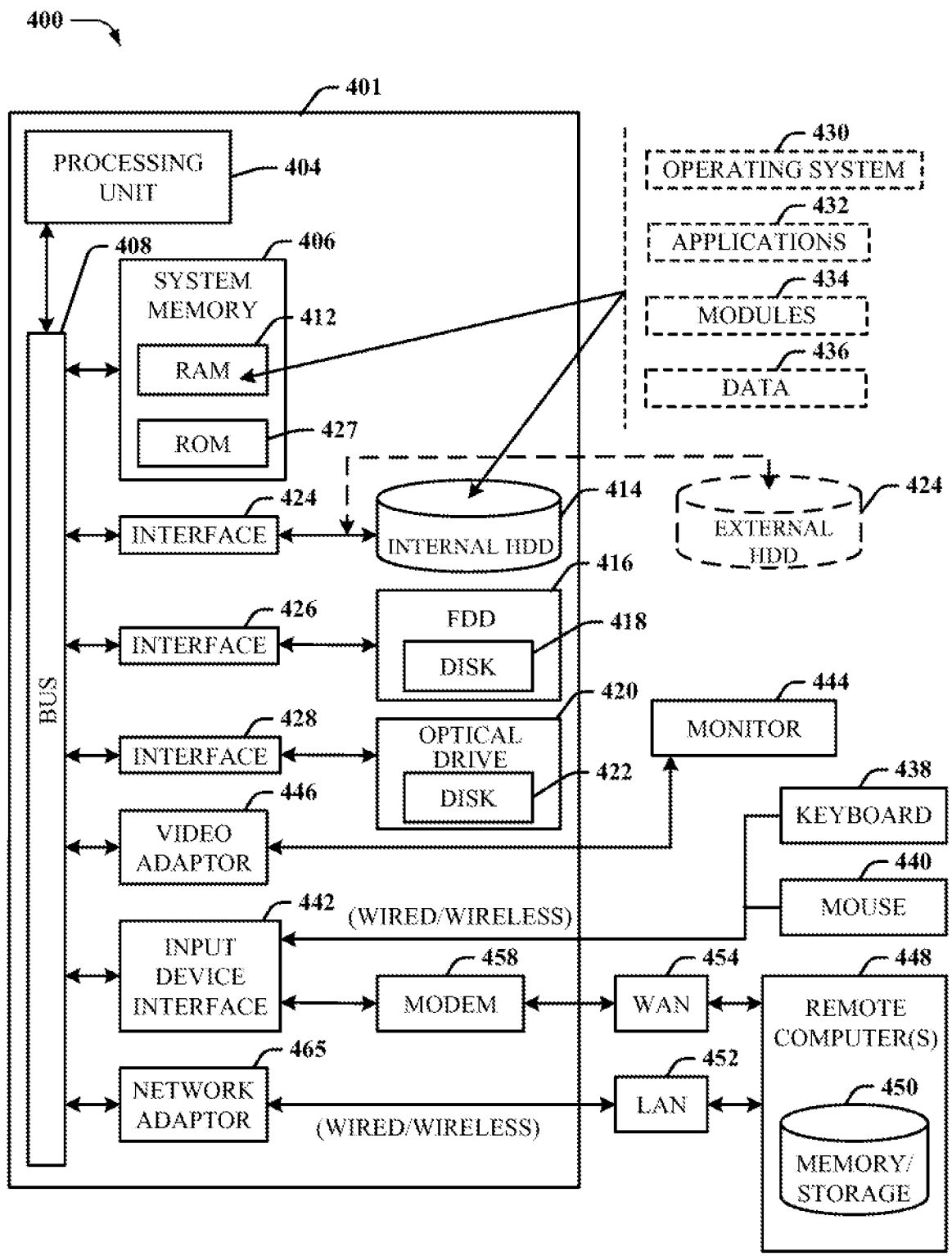
FIG. 4 illustrates an example block diagram of a computer that can be operable to execute processes and methods in accordance with various aspects and embodiments of the subject disclosure.

Referring now to FIG. 4, there is illustrated a block diagram of a computer 400 operable to execute the functions and operations performed in the described example embodiments. For example, a computing device (e.g., controller or processor associated with devices 102, 104, 106, 108, 110, 112, 114, 116, 118, 120, 122, and 124 may contain components as described in FIG. 4. The computer 400 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the transmission of a synchronization signal and synchronization of blinking on a display. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 4, implementing various aspects described herein with regards to the end-user device can include a computer 400, the computer 400 including a processing unit 404, a system memory 406 and a system bus 408. The system bus 408 couples system components including, but not limited to, the system memory 406 to the processing unit 404. The processing unit 404 can be any of various commercially available processors. Dual microprocessors and other multi-processor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 includes read-only memory (ROM) 427 and random-access memory (RAM) 412. A basic input/output system (BIOS) is stored in a non-volatile memory 427 such as ROM, EPROM, EEPROM, which BIOS contains the basic routines that help to transfer information between elements within the computer 400, such as during start-up. The RAM 412 can also include a high-speed RAM such as static RAM for caching data.

The computer 400 further includes an internal hard disk drive (HDD) 414 (e.g., EIDE, SATA), which internal hard disk drive 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416 and optical disk drive 420 can be connected to the system bus 408 by a hard disk drive interface 424, a magnetic disk drive interface 426 and an optical drive interface 428, respectively. The interface 424 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. The drives and media accommodate the storage of any data in a suitable digital format for the computer 400. Although the description of computer-readable media above refers to a HDD, a removable magnetic diskette, and a removable optical media such as a CD or DVD, it should be appreciated by those skilled in the art that other types of media which are readable by a computer 400, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 412, including an operating system 430, one or more application programs 432, other program modules 434 and program data 436. All or portions of the operating system, applications, modules, and/or data can also be cached in the RAM 412. It is to be appreciated that the various embodiments can be implemented with various commercially available operating systems or combinations of operating systems.

A user can enter commands and information into the computer 400 through one or more wired/wireless input devices, e.g., a keyboard 438 and a pointing device, such as a mouse 440. Other input devices (not shown) may include a microphone, an IR remote control, a joystick, a game pad, a stylus pen, touch screen, or the like. These and other input devices are often connected to the processing unit 404 through an input device interface 442 that is coupled to the system bus 408, but can be connected by other interfaces, such as a parallel port, an IEEE 1394 serial port, a game port, a USB port, an IR interface, etc.

A monitor 444 or other type of display device is also connected to the system bus 408 through an interface, such as a video adapter 446. In addition to the monitor 444, a computer 400 typically includes other peripheral output devices (not shown), such as speakers, printers, etc.

The computer 400 can operate in a networked environment using logical connections by wired and/or wireless communications to one or more remote computers, such as a remote computer(s) 448. The remote computer(s) 448 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 450 is illustrated. The logical connections depicted include wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which may connect to a global communications network, e.g., the Internet.

When used in a LAN networking environment, the computer 400 is connected to the local network 452 through a wired and/or wireless communication network interface or adapter 456. The adapter 456 may facilitate wired or wireless communication to the LAN 452, which may also include a wireless access point disposed thereon for communicating with the wireless adapter 456.

When used in a WAN networking environment, the computer 400 can include a modem 458, or is connected to a communications server on the WAN 454, or has other means for establishing communications over the WAN 454, such as by way of the Internet. The modem 458, which can be internal or external and a wired or wireless device, is connected to the system bus 408 through the input device interface 442. In a networked environment, program modules depicted relative to the computer, or portions thereof, can be stored in the remote memory/storage device 450. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As it is employed in the specification contained herein, the term "processor" can refer to substantially any computing or processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular, and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Figure 5:
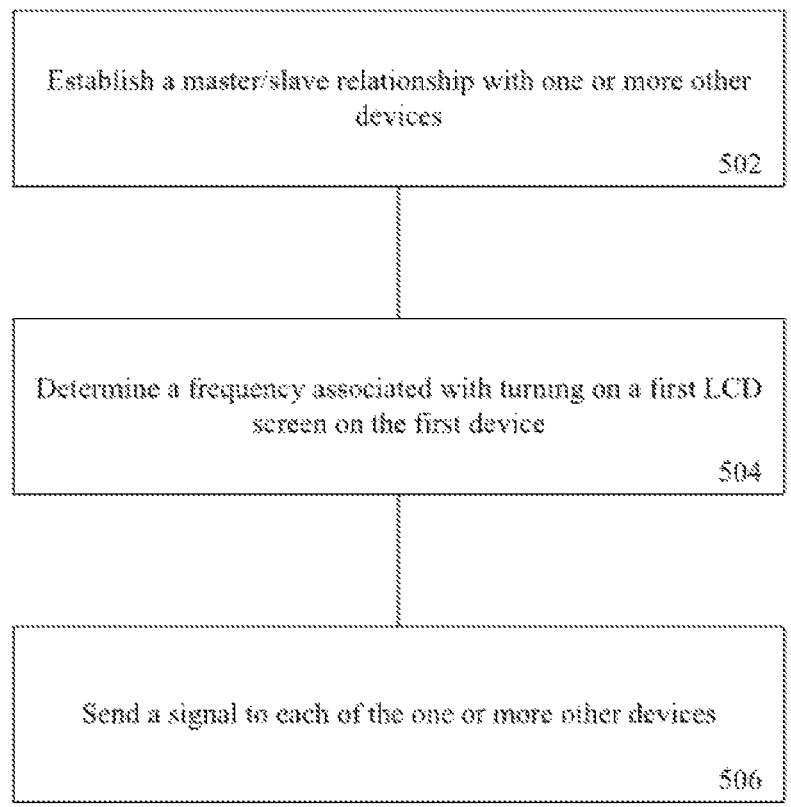
FIG. 5 is a flowchart illustrating example operations in accordance with various embodiments of the present disclosure are provided.

FIG. 5 is a flowchart illustrating example operations in accordance with various embodiments of the present disclosure. The operations of FIG. 5 may be performed by devices 102, 104, 106, 108, 110, 112, 114, 116, 118, 120, 122, and 124. In some examples, one or more of the procedures described in FIG. 5 may be embodied by computer program instructions, which may be stored by a memory (such as a non-transitory memory) of a system employing an embodiment of the present disclosure and executed by a processing circuitry (such as a processor) of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data and/or information.

In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

At operation 502, a processor on devices 102, 104, 106, 108, 110, 112, 114, 116, 118, 120, 122, and 124, such as processor 302 and/or 404 may establish a aster/slave relationship with one or more other devices. As is described herein, the relationship may be established based a first device being connected to a power source (e.g., a charger); a most recent device being connected to a power source, an internal setting, or the like.

At operation 504, a processor on devices 102, 104, 106, 108, 110, 112, 114, 116, 118, 120, 122, and 124, such as processor 302 and/or 404 may determine a frequency associated with turning on a first LCD screen on the first device. As described herein the frequency may be related to a duty cycle that, in some examples, is a duty cycle that reduces current draw by the display.

At operation 506, a processor on devices 102, 104, 106, 108, 110, 112, 114, 116, 118, 120, 122, and 124, such as processor 302 and/or 404 may send a signal to each of the one or more devices. In some examples, the one or more devices may be other devices that are connected to a power source. In other examples, the signal may be sent to allow devices within range where only devices that are connected to a power source are configured to act on the signal. In some examples, the signal may include the frequency, a reference time (e.g., a network time, clock time, or other reference time), a master ID, and/or the like.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or.". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method for synchronizing liquid crystal display (LCD) screens, comprising:
   establishing, by a first device comprising a processor, a master/slave relationship with one or more other devices in response to a determination that the first device is charging;
   determining, by the first device, a frequency associated with turning on a first LCD screen on the first device; and
   sending, by the first device, a signal to each of the one or more other devices, wherein the signal comprises an instruction to turn on an LCD screen on each receiving device at a same time as the first LCD screen.

2. The method for synchronizing LCD screens of claim 1, wherein the first LCD screen and the one or more other LCD screens are activated upon receipt of the signal by the second device.

3. The method for synchronizing the LCD screens of claim 1, wherein the master/slave relationship is established only with the one or more other devices that are determined to be charging.

4. The method for synchronizing the LCD screens of claim 1, wherein the signal is set via at least one of a BLE, Wi-Fi, RFID, or Ethernet communication.

5. The method for synchronizing the LCD screens of claim 1, wherein the first device has been charging for a longer time than the one or more other devices.

6. The method for synchronizing the LCD screens of claim 5, further comprising:
  determining, by the first device, how long each of the one or more other devices has been charging and, if the time is less than the time the first device has been charging, establishing the master/slave relationship.

7. The method for synchronizing the LCD screens of claim 1, further comprising: determining, by the first device, that no other device is a master device before establishing the master/slave relationship with the second device.

8. The method for synchronizing the LCD screens of claim 1, wherein the frequency is determined based on a predefined configuration setting.

9. The method for synchronizing the LCD screens of claim 1, wherein a new master device is established by one of the one or more other devices in response to a determination that the master is no longer charging.

10. The method for synchronizing the LCD screens of claim 9 wherein the new master device is the device that is determined to have been charging for the longest time period.

11. An electronic device comprising:
  a processor; and
  a non-transitory memory including computer program instructions configured to, when executed by the processor, cause the electronic device to at least:
  determine that there is not a current master device of a set of devices; and
  transmit a synchronization signal to each device of the set of devices, wherein the synchronization signal comprises an instruction about when to activate respective LCD screens on each device of the set of devices.

12. The electronic device of claim 11, wherein, the electronic device is configured to transmit the synchronization signal to those devices that are determined to be charging.

13. The electronic device of claim 11, wherein the electronic device is a wearable device.

14. The electronic device of claim 11, wherein the synchronization signal is transmitted via at least one of BLE, Wi-Fi, RFID, or Ethernet communication protocol.

15. The electronic device of claim 11, wherein the synchronization signal is retransmitted at a predefined frequency.

16. The electronic device of claim 11, wherein the synchronization signal comprises an instruction about a time and duration to activate the respective LCD screens and a frequency to reactivate the respective liquid crystal displays.

17. An electronic device comprising:
  a processor; and
  a non-transitory memory including computer program instructions configured to, when executed by the processor, cause the electronic device to at least:
  listen for a synchronization signal in an instance in which the electronic device is charging;
  receive the synchronization signal comprising an instruction about when to activate a liquid crystal display on the electronic device; and
  activate an LCD screen based on the synchronization signal.

18. The electronic device of claim 17, wherein the electronic device is a wearable device.

19. The electronic device of claim 17, wherein the LCD screen is activated upon receipt of the synchronization signal.

* * * * *